United States Patent [19]

Chikamasa et al.

[11] Patent Number: 4,679,744
[45] Date of Patent: Jul. 14, 1987

[54] MAGNETIC TAPE WINDING METHOD AND SYSTEM

[75] Inventors: Hiroshi Chikamasa; Masaaki Sakaguchi, both of Odawara, Japan

[73] Assignee: Fuji Photo Film Co., Ltd., Japan

[21] Appl. No.: 895,937

[22] Filed: Aug. 13, 1986

[30] Foreign Application Priority Data

Aug. 19, 1985 [JP] Japan ............... 60-181258

[51] Int. Cl.$^4$ ............... G06K 9/00
[52] U.S. Cl. ............... 242/67.3 R; 358/106; 382/1
[58] Field of Search ............... 242/56 R, 67.3 R, 57, 242/57.1; 382/1; 358/101, 106, 107

[56] References Cited

U.S. PATENT DOCUMENTS

| | | | |
|---|---|---|---|
| 3,848,825 | 11/1974 | Zielke | 242/56 R |
| 4,280,136 | 7/1981 | Kashima et al. | 358/93 |
| 4,485,674 | 12/1984 | Ragle | 382/1 X |
| 4,565,927 | 1/1986 | Ragle | 382/1 X |

FOREIGN PATENT DOCUMENTS 59-26853  2/1984  Japan ............... 242/57

Primary Examiner—Stanley N. Gilreath
Assistant Examiner—Katherine Matecki
Attorney, Agent, or Firm—Gerald J. Ferguson, Jr.; Michael P. Hoffman; Ronni S. Malamud

[57] ABSTRACT

In a magnetic tape winding system for winding a magnetic tape by a predetermined length around a small winding frame from a magnetic tape feed roll, the condition of winding of the magnetic tape around the small winding frame is detected, and the winding surface condition of the magnetic tape wound around the small winding frame is optically imaged at predetermined timing. The quality of the winding surface condition of the magnetic tape wound around the small winding frame is judged by a calculation processing of image signals obtained by the optical imaging. The speed of magnetic tape winding around the small winding frame is adjusted based on results of the judgment.

4 Claims, 7 Drawing Figures

DOT NUMBER AT THIS SECTION IS COMPARED WITH SET VALUE.

MAGNETIC TAPE WINDING METHOD AND SYSTEM

BACKGROUND OF THE INVENTION

1. Field of the Invention

This invention relates to a magnetic tape winding method for winding a predetermined length of a magnetic tape from a magnetic tape feed roll to a small winding frame, and a system for carrying out the method.

2. Description of the Prior Art

In an intermediate process of fabrication of audio cassette tapes, video cassette tapes or the like, a predetermined length of a magnetic tape is wound around a small winding frame such as a reel from a continuous length magnetic tape feed roll. In the winding process, magnetic tape winding is conducted to obtain approximately 20 rolls wound around small winding frames from one magnetic tape feed roll. In this process, winding around the small winding frames is carried out at a constant speed.

However, physical properties of magnetic tape feed rolls are not always the same. When winding is conducted from a magnetic tape feed roll exhibiting physical properties different from those of normal magnetic tape feed rolls, tape behavior during winding becomes different, and therefore a disturbance arises in the winding appearance of the magnetic tape wound around a small winding frame, i.e. the winding surface condition as viewed in the axial direction of the small winding frame. The magnetic tape roll having a disturbed winding appearance is discarded as a substandard product. When the winding appearance defect arises in winding from a magnetic tape feed roll, since the physical properties are nearly uniform over the entire length of the magnetic tape of the same magnetic tape feed roll, the winding appearance defect arises with almost all magnetic tape rolls wound around the small winding frames from said magnetic tape feed roll. In this case, almost all of the magnetic tape rolls are discarded, and the yield in the winding process becomes very low.

SUMMARY OF THE INVENTION

The primary object of the present invention is to provide a magnetic tape winding method wherein winding operations are conducted without generating a disturbance in winding appearance of a magnetic tape even though physical properties of a magnetic tape feed roll are different from those of normal magnetic tape feed rolls.

Another object of the present invention is to provide a magnetic tape winding method which markedly improves the yield in the winding process.

The specific object of the present invention is to provide a system for carrying out the method.

The present invention is based on the finding that, even though the physical properties of a magnetic tape feed roll are different from those of normal magnetic tape feed rolls, good products free from disturbance in winding appearance can be obtained by appropriately changing (generally by decreasing) the speed of magnetic tape winding around small winding frames. In the present invention, the condition of the winding surface of a first magnetic tape roll wound around a first small winding frame after the operations for winding the magnetic tape from a magnetic tape feed roll to small winding frames are started is judged. Based on the result of the judgment, the speed of magnetic tape winding around the second and subsequent small winding frames is adjusted.

Accordingly, the present invention provides a magnetic tape winding method for winding a magnetic tape by a predetermined length around a small winding frame from a magnetic tape feed roll, which comprises the steps of:

(i) detecting the condition of winding of said magnetic tape around said small winding frame, (ii) optically imaging a winding surface condition of said magnetic tape wound around said small winding frame at predetermined timing, (iii) judging the quality of the winding surface condition of said magnetic tape wound around said small winding frame by a calculation processing of image signals obtained by said optical imaging, and (iv) changing the speed of magnetic tape winding around said small winding frame as required based on results of said judgment.

The judgment of the quality of the winding surface need be conducted only for the first magnetic tape roll wound around the first small winding frame after the operations of winding from the magnetic tape feed roll are started. However, it is also possible to effect general judgment for several magnetic tape rolls at the beginning of the winding operations, and to adjust the speed of winding around the subsequent small winding frames.

In the case where unsatisfactory judgment results are obtained after the winding speed is changed based on the aforesaid judgment results, the operation of changing the winding speed may be repeated until satisfactory judgment results are obtained.

The present invention also provides a magnetic tape winding system for winding a magnetic tape by a predetermined length around a small winding frame from a magnetic tape feed roll, which comprises:

(i) a winding apparatus for rotating said small winding frame and winding said magnetic tape around said small winding frame at a predetermined speed, (ii) a camera device for optically imaging a winding surface condition of said magnetic tape wound around said small winding frame, (iii) a winding appearance judgment device for judging the quality of the winding surface condition of said magnetic tape wound around said small winding frame by a calculation processing of image signals generated by said camera device, (iv) a winding speed command device for sending a command to said winding apparatus based on results of judgment of said winding appearance judgment device to make said winding apparatus change the speed of magnetic tape winding around said small winding frame as required, and (v) a judgment timing generator for detecting the condition of winding of said magnetic tape around said small winding frame conducted by said winding apparatus, and activating said winding appearance judgment device at predetermined timing.

The aforesaid magnetic tape winding system may also be constituted so that a plurality of the winding apparatuses and the camera devices in a number equal to the number of the winding apparatuses are provided, the judgment timing generator sequentially detects the magnetic tape winding conditions at the respective winding apparatuses, and the winding appearance judgment device sequentially switches inputs of the image signals thereto from the respective camera devices corresponding to winding apparatuses based on the detection signal sent from the judgment timing generator.

Further, the aforesaid magnetic tape winding system may be constituted so that a plurality of the winding apparatuses are provided, the judgment timing generator detects the magnetic tape winding conditions at the respective winding apparatuses, the camera devices are movably provided in a number smaller than the number of the winding apparatuses, and one of the camera devices is moved to a predetermined position for the winding apparatus corresponding to the detection signal sent from the judgment timing generator based on said detection signal.

In the present invention, even though the winding appearance of the first roll or several rolls wound around the small winding frame or frames after winding operations from a magnetic tape feed roll are started are defective, it is possible to avoid the defects in the subsequent rolls. Therefore, unlike the conventional technique wherein all of the magnetic tape rolls wound around small winding frames from a magnetic tape feed roll become defective in winding appearance when the physical properties of the feed roll are different from those of normal feed rolls, it is possible in the present invention to confine the generation of defect only to the first or first few magnetic tape rolls at the beginning of the winding operations and to markedly improve the yield in the winding process.

Also, in the conventional technique, sampling inspection or the like is conducted in the fabrication processes to guarantee the quality of the winding appearance of the magnetic tape. However, in the present invention, since the quality of the winding appearance of the magnetic tape is automatically judged in the winding process and defective products are removed at this stage, it is possible to omit the inspection process. Further, since total inspection is automatically carried out, it is possible to maintain high quality of the delivered magnetic tape products.

DESCRIPTION OF THE PREFERRED EMBODIMENTS

The present invention will hereinbelow be described in further detail with reference to the accompanying drawings.

Figure 1:
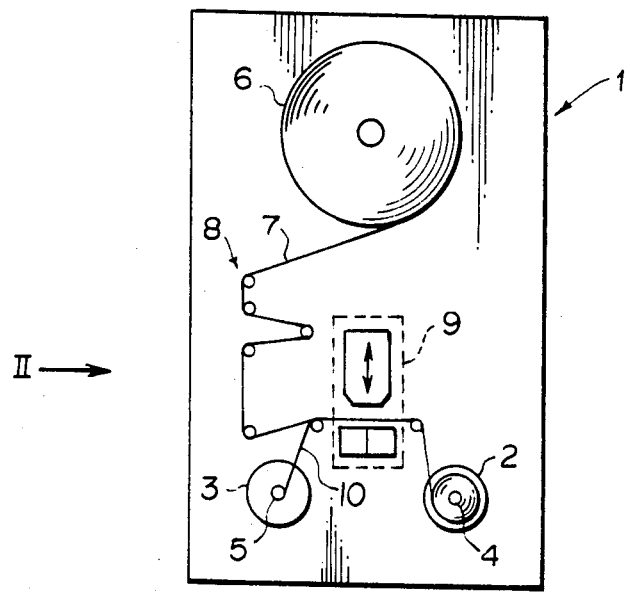
FIG. 1 is a front view showing an example of the winding apparatus used in an embodiment of the magnetic tape winding method in accordance with the present invention.

FIG. 1 shows a winding apparatus 1 used in an embodiment of the magnetic tape winding method in accordance with the present invention.

The winding apparatus 1 is provided with shafts 4 and 5 for respectively supporting small winding frames 2 and 3. The shaft 4 is rotated to wind a magnetic tape 7 from a magnetic tape feed roll 6 to the small winding frame 2 via a pass system 8. After the magnetic tape 7 is wound by a predetermined length around the small winding frame 2, the magnetic tape 7 is cut by a cutting and joining mechanism 9, and the cut end of the magnetic tape 7 is joined with an end of a leader tape 10 having the other end secured to the small winding frame 3.

Figure 2:
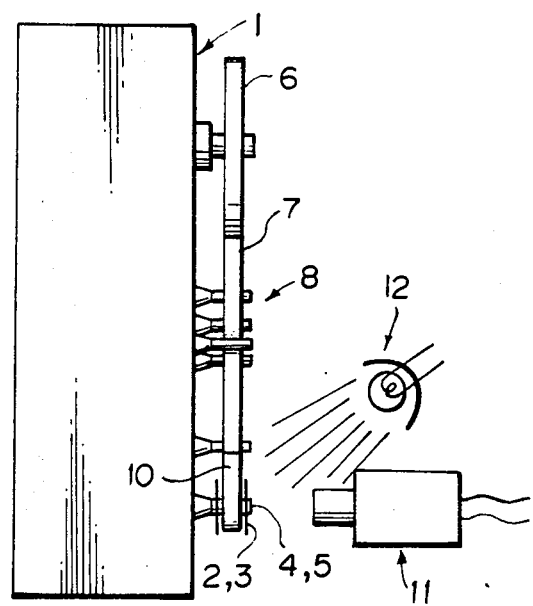
FIG. 2 is a schematic view taken in the direction as indicated by the arrow II of FIG. 1.

FIG. 2 is a view taken in the direction as indicated by the arrow II of FIG. 1, and shows an ITV camera (industrial TV camera) 11 and an illuminating device 12 together with the winding apparatus 1.

The ITV camera 11 optically forms an image of the winding surface condition of the magnetic tape 7 wound around the small winding frame 2. The ITV camera 11 is provided at a predetermined position in front of the winding apparatus 1 to face the small winding frame 2. The illuminating device 12 is positioned above the ITV camera 11 to illuminate the magnetic tape 7 wound around the small winding frame 2, which is imaged by the ITV camera 11, at an angle of approximately 45°.

Figure 3:
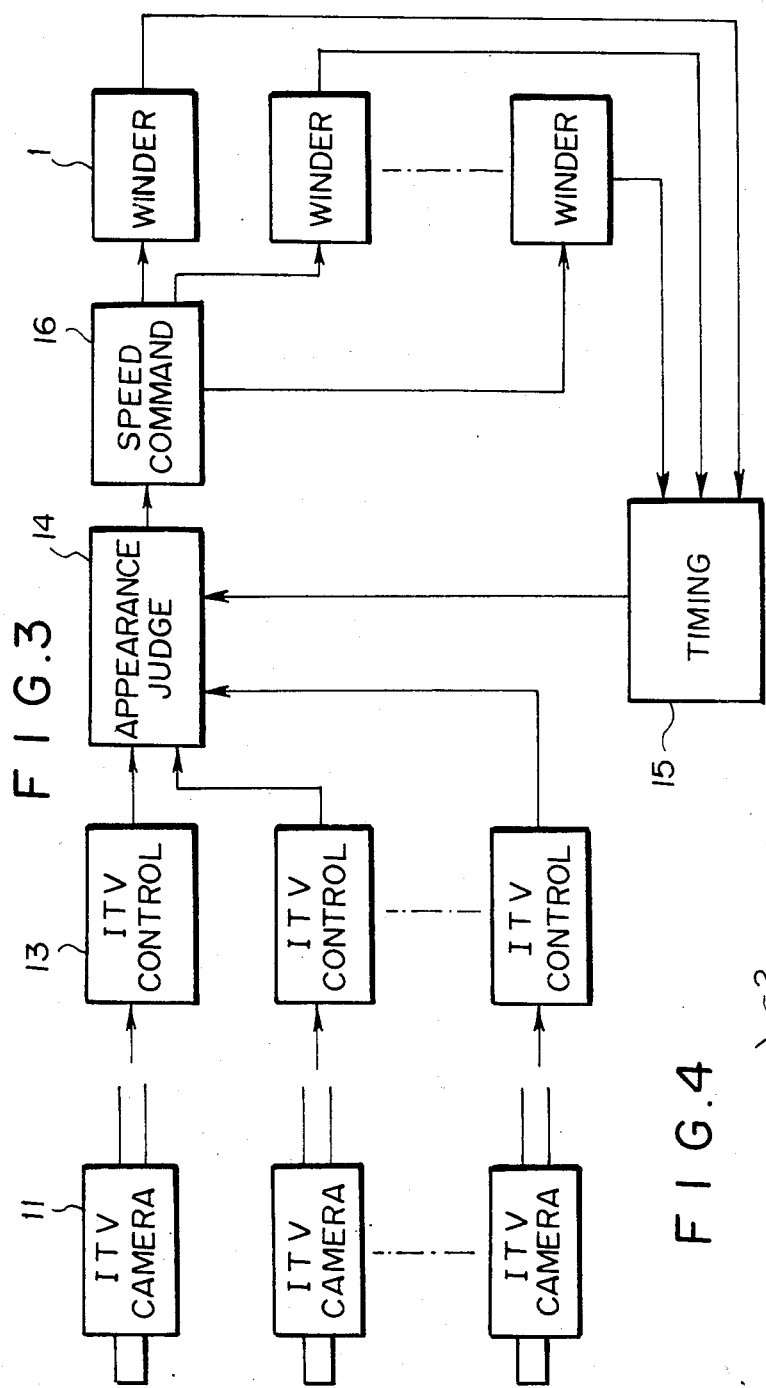
FIG. 3 is a block diagram showing an embodiment of the magnetic tape winding method in accordance with the present invention.

As shown in FIG. 3, the ITV cameras 11, 11, ... in a number equal to the number of the winding apparatuses 1, 1, ... are provided at the predetermined positions with respect to the winding apparatuses 1, 1, ..., and respectively connected with ITV controllers 13, 13, .... Image signals obtained by each of the ITV cameras 11, 11, ... are sent to a winding appearance judgment device 14 via the corresponding ITV controller 13. The winding appearance judgment device 14 conducts a calculation processing of the image signals by a predetermined algorithm, and judges the quality of the winding surface of the magnetic tape 7 wound around the small winding frame 2.

Figure 4:
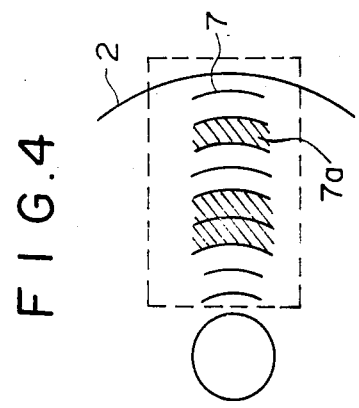
FIG. 4 is a partial schematic view showing a magnetic tape roll wound around a small winding frame and having a disturbed winding surface.

FIG. 4 schematically shows an example of the image formed by the ITV camera 11 when the winding surface of the magnetic tape 7 wound around the small winding frame 2 is disturbed. When the winding surface is disturbed, a dark line 7a is formed by interception of light at an angle of approximately 45°. (When the winding surface is not disturbed, since it is like a mirror surface, no dark line is formed.) The winding appearance judgment device 14 judges the quality of the winding surface by use of a predetermined criterion on the basis of the size of the dark area, the number of the dark lines, or the like in the brightness pattern.

Figure 5:
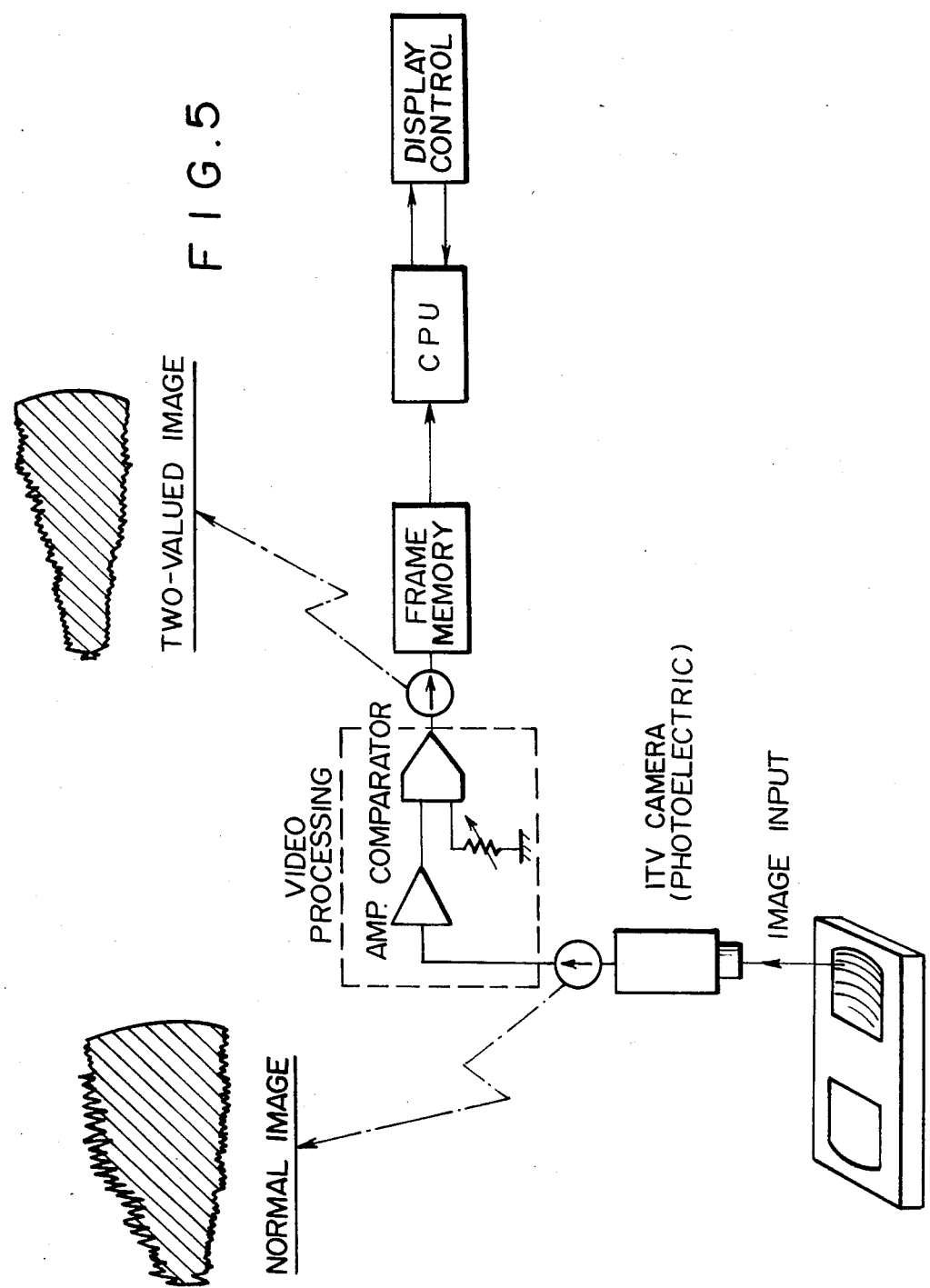
FIGS. 5 and 6 are a block diagram and a flow diagram showing an example of the method of judging the quality of the winding surface condition of the magnetic tape wound around a small winding frame.
Figure 6:
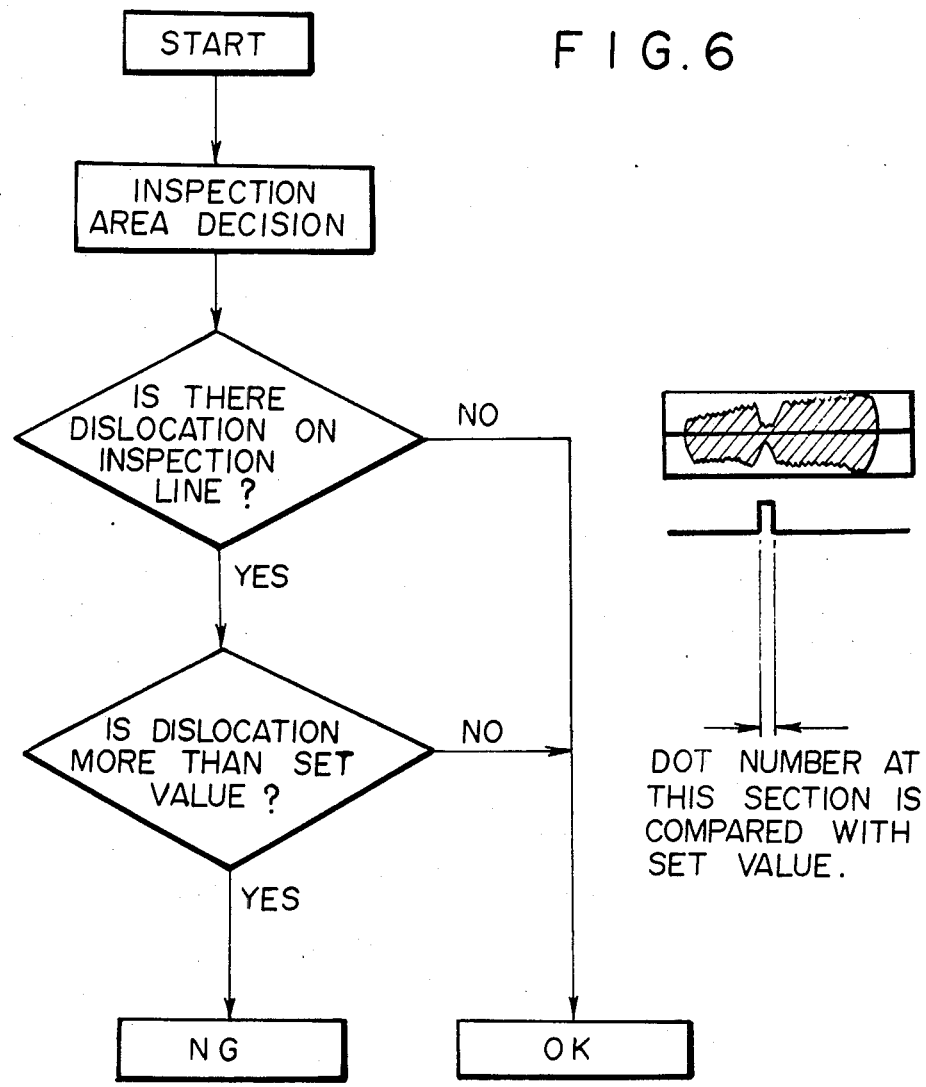

FIGS. 5 and 6 show an example of the judgment method.

The timing at which the winding surface condition of the magnetic tape 7 wound around the small winding frame 2 is judged by the winding appearance judgment device 14 shown in FIG. 3 is decided for the respective ITV cameras 11, 11, ... based on a signal generated by a judgment timing generator 15. Specifically, the judgment timing generator 15 is connected with the winding apparatuses 1, 1, ... to detect the condition of winding of the magnetic tape 7 around the small winding frame 2 at each of the winding apparatuses 1, 1, ... and activate the winding appearance judgment device 14 at predetermined timing. For example, when the winding of the magnetic tape 7 around the small winding frame 2 at one of the winding apparatuses 1, 1, . . . is completed, the judgment timing generator 15 receives a completion signal from the winding apparatus 1 and instructs the winding appearance judgment device 14 to judge the quality of the winding surface condition of the magnetic tape 7 wound around the small winding frame 2 at the winding apparatus 1 based on the image signal generated by the ITV camera 11 corresponding to the winding apparatus 1. The result of judgment conducted by the winding appearance judgment device 14 at the predetermined timing is sent to a winding speed command device 16. In the case where the judgment result does not satisfy the predetermined criterion, the winding speed command device 16 instructs the winding apparatus 1 to decrease the speed of winding of the magnetic tape 7 around the small winding frame 2. When the judgment result satisfies the predetermined criterion, the winding speed command device 16 instructs the winding apparatus 1 to maintain the winding speed. Thus when the winding surface condition of the first roll of the magnetic tape 7 wound around the small winding frame 2 from the magnetic tape feed roll 6 is judged to be defective, the winding speed for the second roll around the second small winding frame 2 and the subsequent rolls is decreased, thereby improving the winding surface condition. In the case where the winding surface condition of the second roll around the second small winding frame 2 is also judged to be defective, the winding speed command device 16 instructs the winding apparatus 1 to decrease the winding speed for the third small winding frame 2 and the subsequent winding frames to a lower value. The magnetic tape 7 wound around the small winding frame 2 the winding surface condition of which is judged to be defective is automatically or manually removed from the winding apparatus 1 based on the judgment result.

The aforesaid operations are carried out independently for the respective sets of the winding apparatuses 1, 1, . . . and the ITV cameras 11, 11, . . . by sequentially switching the image signal inputs sent by the ITV cameras 11, 11, . . . at the winding appearance judgment device 14 based on the signals sent by the respective winding apparatuses 1, 1, . . . and detected by the judgment timing generator 15.

Figure 7:
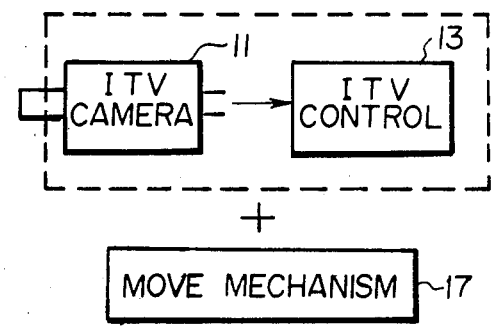
FIG. 7 is a block diagram showing a modified form of the ITV camera and ITV controller section of FIG. 3.

FIG. 7 shows a modified form of the ITV camera and ITV controller section wherein a single ITV camera 11, a single ITV controller 13, and a movement mechanism 17 are used instead of a plurality of the ITV cameras 11, 11, . . . and a plurality of the ITV controllers 13, 13, . . . in the embodiment of FIG. 3. Specifically, unlike the embodiment of FIG. 3 wherein the ITV cameras 11, 11, . . . and the ITV controllers 13, 13, . . . are respectively provided in a number equal to the number of the winding apparatuses 1, 1, . . . , the single ITV camera 11 and the single ITV controller 13 are sequentially moved by the movement mechanism 17 to predetermined positions in front of the winding apparatuses 1, 1, . . . to achieve the same operation effects as when a plurality of the ITV cameras 11, 11, . . . and a plurality of the ITV controllers 13, 13, . . . are provided. This modified form is advantageous from the economical viewpoint insofar as the movements of the ITV camera 11 and the ITV controller 13 conducted by the movement mechanism 17 match the timing of the winding appearance judgment at each of the winding apparatuses 1, 1, . . . . It is also possible to use a plurality of the ITV cameras 11, 11, . . . , a plurality of the ITV controllers 13, 13, . . . and a plurality of the movement mechanisms 17, 17, . . . respectively in a number smaller than the number of the winding apparatuses 1, 1, . . . .

In the aforesaid embodiment, the winding speed for the second small winding frame and the subsequent small winding frames is changed based on the judgment result of the winding surface condition of the magnetic tape 7 wound around the first small winding frame 2 by the winding apparatus 1. However, it is also possible to compare a general judgment result of several magnetic tape rolls wound around the small winding frames at the beginning of the winding operations with a predetermined criterion, and to adjust the winding speed for the subsequent small winding frames based on the comparison.

Also, the small winding frame 2 may be of any type other than the reel, for example, a hub having no flange. The present invention is applicable also to an in-cassette winder wherein a magnetic tape is directly wound into a cassette provided with a transparent window as in the case of a cassette tape, V-O winding (for video cassette), and C-O winding (for audio cassette).

The present invention is particularly advantageous for the V-O winding and the C-O winding wherein decorative winding is comparatively difficult.

Also, instead of the ITV camera 11, it is also possible to use a general linear array camera such as a CCD array, or a camera employing a matrix array.

We claim:

1. A magnetic tape winding method for winding a predetermined length of magnetic tape around a small winding frame from a magnetic tape feed roll, which comprises the steps of:
   (i) detecting the quantity of said magnetic tape wound around said small winding frame,
   (ii) optically imaging a winding surface condition of said magnetic tape wound around said small winding frame when a predetermined quantity of tape has been detected,
   (iii) judging the quality of the winding surface condition of said magnetic tape wound around said small winding frame by a calculation processing of image signals obtained by said optical imaging, and
   (iv) changing the speed of magnetic tape winding around said small winding frame based on results of said judgment.

2. A magnetic tape winding system for winding a predetermined length of magnetic tape around a small winding frame from a magnetic tape feed roll, which comprises:
   (i) a winding apparatus for rotating said small winding frame and winding said magnetic tape around said small winding frame at a predetermined speed,
   (ii) a camera device for optically imaging a winding surface condition of said magnetic tape wound around said small winding frame,
   (iii) a winding appearance judgment device for judging the quality of the winding surface condition of said magnetic tape wound around said small winding frame by a calculation processing of image signals generated by said camera device,
   (iv) a winding speed command device for sending a command to said winding apparatus based on results of judgment of said winding appearance judgment device to make said winding apparatus change the speed of magnetic tape winding around said small winding frame, and
   (v) a judgment timing generator for detecting the quantity of said magnetic tape wound around said small winding frame, and activating said winding appearance judgment device when a predetermined quantity of tape is detected.

3. A magnetic tape winding system as defined in claim 2 wherein a plurality of said winding apparatuses and a plurality of said camera devices are provided to correspond to each other, said judgment timing generator detecting the magnetic tape winding quantities at the respective winding apparatuses, and said winding appearance judgment device including means for sequentially switching the inputs of said image signals thereto from said respective camera devices corresponding to said winding apparatuses on the basis of a detection signal sent from said judgment timing generator.

4. A magnetic tape winding system as defined in claim 2 wherein a plurality of said winding apparatuses are provided, said judgment timing generator detecting the magnetic tape winding quantities at said respective winding apparatuses, said camera device being provided in a number smaller than the number of said winding apparatuses, and said camera device including means for moving to a predetermined position with respect to said winding apparatus in response to a detection signal sent from said judgment timing generator.

* * * * *